UNITED STATES PATENT OFFICE.

ADOLPHE TEYSONNIERE, OF PARIS, FRANCE, ASSIGNOR TO EDWARD MARSTON AND HENRY KLEINAU, OF LONDON, ENGLAND.

IMPROVEMENT IN COPYING-INKS.

Specification forming part of Letters Patent No. 151,633, dated June 2, 1874; application filed May 14, 1874.

*To all whom it may concern:*

Be it known that I, ADOLPHE TEYSONNIERE, of Paris, in the Republic of France, have invented certain Improvements in the Preparation of Copying-Inks, of which the following is a specification:

The object of this invention is to provide a copying-ink which, by the simple addition thereto of water, will afford a perennial supply of limpid fluid to the dipping cup or cone of inkstands. The difficulty hitherto experienced in rendering copying-inks amenable to the treatment to which inks employed in what are known as perpetual inkstands are subjected, has arisen from the tendency of the dissolved coloring matters to undergo a chemical change, which results in the formation of an insoluble deposit in the ink-pot, rendering the ink more or less thick and ropy, and causing it to lose its fluidity or quality of flowing readily from the pen. To prevent this change from taking place it is now proposed to acidify the ink compound, and thereby to provide a dissolving agent which will counteract the chemical action mentioned above, and prevent the formation of the insoluble ropy matter, either by dissolving the same in the first stages of its formation when it is presented to the dissolving agent in its nascent state, or, which is more probable, by exercising a preservative or, so to speak, antiseptic action, which prevents that chemical change from occurring at all which imparts insolubility to the ink.

In preparing the ink compound, any suitable or well-known mixture of ink-powders or dry preparation of ink capable of yielding, by the addition of water, a strong colored solution, may be used, and to these are to be added gum and sugar, or the equivalent therefor, as is now practiced in preparing copying-inks. To render this compound capable of being employed as above indicated, bioxalate of potash or oxalic acid is added, in excess in proportion, varying according to the ingredients used, and thus the tendency of the coloring matter to undergo chemical decomposition and deposit the thick ropy matter will be removed. In order to insure a limpid ink the solid compound is applied to a filtering-inkstand, such as is described in the specification of an American patent issued to Edward Marston and Henry Kleinau, and bearing date March 24, 1874. In this inkstand the color, as it is dissolved out by the application of water thereto, passes through a porous medium, which acts as a filter, and keeps back any solid or semi-solid matters, and allows only the limpid fluid to reach the dipping cup or cone. This filtering process is important, as otherwise the copying-ink would be liable, from its "tacky" nature, to present a semi-fluid mass to the nibs of the pen.

Having now set forth the nature of my invention, and explained the manner of carrying the same into effect, I wish it to be understood that I claim—

The combination of bioxalate of potash or other acid oxalate, or of oxalic acid, with an ink-powder or its equivalent, prepared to yield ink when dissolved in water, such coloring material having been prepared by the admixture therewith of sugar, dextrine, or its equivalent, to give the property of a copying-ink.

Paris, the 23d day of April, 1874.

AD. TEYSONNIERE.

Witnesses:
   ROBT. M. HOOPER,
      9 *Rue Castiglione, Paris.*
   H. O. WAGONER, Jr.